(12) United States Patent
Ueki et al.

(10) Patent No.: US 6,456,573 B1
(45) Date of Patent: Sep. 24, 2002

(54) INFORMATION RECORDING AND REPRODUCING APPARATUS

(75) Inventors: Yasuhiro Ueki, Sagamihara (JP); Yutaka Osada, Fujisawa (JP); Osamu Yanagisawa, Chiba (JP); Chikashi Inokuchi, Hirakata (JP); Yuuichi Kamioka, Katano (JP); Kohjyu Konno, Takatsuki (JP)

(73) Assignees: Victor Company of Japan, Ltd., Yokohama (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/954,024

(22) Filed: Sep. 18, 2001

(30) Foreign Application Priority Data

Oct. 20, 2000 (JP) ........................................ 2000-320480

(51) Int. Cl.[7] ................................................. G11B 5/09
(52) U.S. Cl. .................................................. 369/47.17
(58) Field of Search ........................... 369/44.27, 275.4, 369/369.47, 275.1, 94, 44.25, 44.13, 47.48, 47.17

(56) References Cited

U.S. PATENT DOCUMENTS 6,097,678 A * 8/2000 Yoshida et al. .......... 369/47.28
6,144,625 A * 11/2000 Kuroda et al. ........... 369/44.25

FOREIGN PATENT DOCUMENTS

JP 10-241260 9/1998
JP 10-320781 12/1998

* cited by examiner

*Primary Examiner*—William Korzuch
*Assistant Examiner*—Kimlien Thi Le
(74) *Attorney, Agent, or Firm*—Louis Woo

(57) ABSTRACT

An apparatus operates for recording and reproducing information on and from a recording medium formed with a track and pre-pits. The track has a wobble. The pre-pits are in a predetermined phase relation with the wobble of the track. The apparatus includes a pickup for reproducing a signal from the recording medium. A limiter operates for limiting an amplitude of the signal reproduced by the pickup in response to a limiting level, and thereby processing the signal reproduced by the pickup into a limiting-resultant signal. A filter operates for suppressing components of the limiting-resultant signal, and thereby processing the limiting-resultant signal into a filtering-resultant signal. The components have specified frequencies, and are caused by the pre-pits. The limiting level for the limiter is generated in response to the filtering-resultant signal. A signal caused by the wobble of the groove is extracted from the filtering-resultant signal.

7 Claims, 6 Drawing Sheets

INFORMATION RECORDING AND REPRODUCING APPARATUS

BACKGROUND OF THE INVENTION

1. Field of the Invention

This invention relates to an apparatus for recording and reproducing information on and from a recording medium formed with a wobbling track and pre-pits.

2. Description of the Related Art

Optical discs include a DVD-R (DVD Recordable) and a DVD-RW (DVD Rewritable). Each of the DVD-R and the DVD-RW has a disc member formed with a spiral of a wobbling groove on and from which main information can be recorded and reproduced. The wobble of the groove indicates first auxiliary information recorded on the disc member. The first auxiliary information contains a reference clock signal. The disc member has land portions between neighboring groove portions. A groove portion and a pair of land portions adjoining the groove portion compose a track portion. Second auxiliary information (land pre-pit signals) is previously recorded on the land portions. Specifically, the second auxiliary information is represented by land pre-pits formed in the land portions. The second auxiliary information contains address information from which the position of an arbitrary point on the disc member can be detected.

During the recording of main information on the DVD-R or the DVD-RW or the reproduction of main information therefrom, the track is scanned by a laser beam while the disc is rotated. In this case, the wobble of the groove in the track and the pre-pits in the lands in the track are detected. A wobble signal is generated in response to the detection of the wobble of the groove. The reference clock signal is reproduced from the wobble signal. Rotation of the disc is controlled in response to the reproduced reference clock signal. Land pre-pit signals are generated in response to the detection of the pre-pits. The position of a currently-accessed point on the disc is detected from the land pre-pit signals.

The generation of the land pre-pit signals is implemented as follows. The wobble of the groove and the positions of the pre-pits in the lands are in a predetermined phase relation. A reflected laser beam coming from the disc is converted into an electric signal. A wobble signal is extracted from the electric signal. The wobble signal has a level which alternates in accordance with the wobble of the groove. Spike-like peak signals caused by the pre-pits are superimposed on the wobble signal. The wobble signal is compared with a reference signal of a fixed threshold level so that high-level portions of the wobble signal which exceed the threshold level are selected. A gate signal synchronous with the wobble signal is generated. AND operation is executed between the gate signal and the high-level portions of the wobble signal, thereby extracting the spike-like peak signals from the high-level portions of the wobble signal. The extracted spike-like peak signals constitute the land pre-pit signals.

Japanese patent application publication number 10-320781 discloses an apparatus for detecting pre-pit signals. In the apparatus of Japanese application 10-320781, a first wobble signal is extracted from the output signal of an optical pickup. Pre-pit signals each having a spike-like waveform are superimposed on the first wobble signal. A PLL-based servo circuit generates a sync signal in response to the first wobble signal. The sync signal is equal in phase and frequency to the first wobble signal. The sync signal periodically peaks. A timing of every peak of the sync signal coincides with a moment at which a pre-pit signal is expected to be superimposed on the first wobble signal. The sync signal is basically equal in waveform to the first wobble signal except spike-like components corresponding to pre-pit signals. The first wobble signal is biased by a reference voltage, being changed into a second wobble signal. The second wobble signal and the sync signal are compared with each other so that the pre-pit signals are extracted or detected. In the case where the second wobble signal has a noise component at a time position near a pre-pit signal, it tends to be difficult to discriminate the pre-pit signal from the noise component.

Japanese patent application publication number 10-241260 discloses an apparatus for recording information on a DVD-R. In the apparatus of Japanese application 10-241260, a first wobble signal is extracted from the output signal of an optical pickup. Pre-pit signals each having a spike-like waveform are superimposed on the first wobble signal. The first wobble signal is subjected to an amplitude limiting process responsive to an upper limiting signal and a lower limiting signal so that pre-pit signals in the first wobble signal are suppressed. The upper limiting signal and the lower limiting signal are generated from the first wobble signal. Accordingly, the upper limiting signal and the lower limiting signal depend on the first wobble signal. The limiting-resultant wobble signal, which is called a second wobble signal, propagates through a band pass filter tuned to a true wobble frequency. The band pass filter attenuates the pre-pit signals in the second wobble signal. The output signal from the band pass filter is referred to as a final wobble signal. The final wobble signal is binarized into a reference clock signal used for the control of rotation of the DVD-R. In the case where the pre-pit signals remain in the final wobble signal to a considerable degree, the reference clock signal tends to have an unacceptable frequency error.

SUMMARY OF THE INVENTION

It is a first object of this invention to provide an information recording and reproducing apparatus which can reliably discriminate pre-pit signals from noise signal components.

It is a second object of this invention to provide an information recording and reproducing apparatus which can reliably separate a true wobble signal from pre-pit signals and noise signal components.

A first aspect of this invention provides an apparatus for recording and reproducing information on and from a recording medium formed with a track and pre-pits, the track having a wobble, the pre-pits being in a predetermined phase relation with the wobble of the track. The apparatus comprises a pickup for reproducing a signal from the recording medium; a limiter for limiting an amplitude of the signal reproduced by the pickup in response to a limiting level, and thereby processing the signal reproduced by the pickup into a limiting-resultant signal; a filter for suppressing components of the limiting-resultant signal generated by the limiter, and thereby processing the limiting-resultant signal into a filtering-resultant signal, the components having specified frequencies and being caused by the pre-pits; first means for generating the limiting level for the limiter in response to the filtering-resultant signal generated by the filter; and second means for extracting, from the filtering-resultant signal generated by the filter, a signal caused by the wobble of the groove.

A second aspect of this invention is based on the first aspect thereof, and provides an apparatus further comprising third means for controlling the limiting level for the limiter in response to whether the apparatus is operating in a recording mode or a reproducing mode.

A third aspect of this invention provides an apparatus for recording and reproducing information on and from a recording medium formed with a track and pre-pits, the track having a wobble, the pre-pits being in a predetermined phase relation with the wobble of the track. The apparatus comprises a pickup for reproducing a signal from the recording medium; a limiter for limiting an amplitude of the signal reproduced by the pickup in response to a limiting level, and thereby processing the signal reproduced by the pickup into a limiting-resultant signal; a filter for suppressing components of the limiting-resultant signal generated by the limiter, and thereby processing the limiting-resultant signal into a filtering-resultant signal, the components having specified frequencies and being caused by the pre-pits; a phase adjuster for adjusting a phase of the filtering-resultant signal generated by the filter, and thereby changing the filtering-resultant signal generated by the filter into an adjustment-resultant signal; first means for generating the limiting level for the limiter in response to the adjustment-resultant signal generated by the phase adjuster; and second means for extracting, from the filtering-resultant signal generated by the filter, a signal caused by the wobble of the groove.

A fourth aspect of this invention is based on the third aspect thereof, and provides an apparatus wherein the phase adjuster comprises means for adjusting the phase of the filtering-resultant signal by a variable quantity.

A fifth aspect of this invention provides an apparatus for recording and reproducing information on and from a recording medium formed with a track and pre-pits, the track having a wobble, the pre-pits being in a predetermined phase relation with the wobble of the track. The apparatus comprises a pickup for reproducing a signal from the recording medium; a first amplifier for amplifying the signal reproduced by the pickup into a first amplification-resultant signal at a gain corresponding to a factor of X, where X denotes a predetermined positive number; a limiter for limiting an amplitude of the first amplification-resultant signal generated by the first amplifier in response to a limiting level, and thereby processing the first amplification-resultant signal into a limiting-resultant signal; a low pass filter for suppressing components of the limiting-resultant signal generated by the limiter, and thereby processing the limiting-resultant signal into a first filtering-resultant signal, the components having specified frequencies and being caused by the pre-pits; first means for generating the limiting level for the limiter in response to the first filtering-resultant signal generated by the low pass filter; a high pass filter for processing the first filtering-resultant signal generated by the low pass filter into a second filtering-resultant signal; second means for converting the second filtering-resultant signal generated by the high pass filter into a signal corresponding to the wobble of the groove; a second amplifier for amplifying the first filtering-resultant signal generated by the low pass filter into a second amplification-resultant signal at a gain corresponding to a factor of 1/X; and a comparator for comparing the signal reproduced by the pickup and the second amplification-resultant signal generated by the second amplifier to generate a signal corresponding to the pre-pits.

A sixth aspect of this invention is based on the fifth aspect thereof, and provides an apparatus wherein the limiting level for the limiter is variable.

A seventh aspect of this invention is based on the fifth aspect thereof, and provides an apparatus further comprising third means for controlling the limiting level for the limiter in response to whether the apparatus is operating in a recording mode or a reproducing mode.

DETAILED DESCRIPTION OF THE INVENTION

First Embodiment

Figure 1:
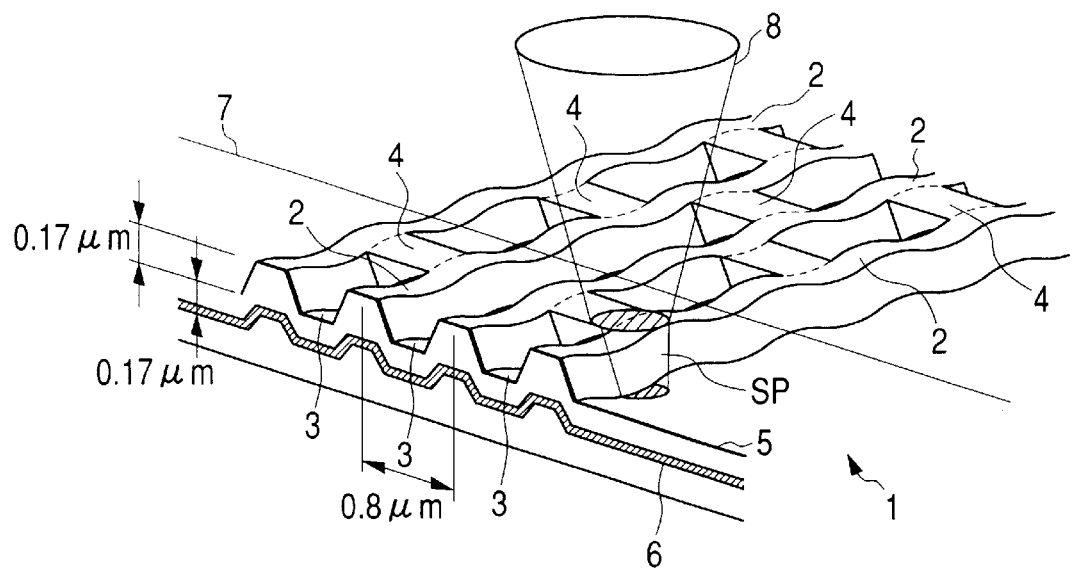
FIG. 1 is a perspective view, partially in section, of a portion of an optical disc.

With reference to FIG. 1, an optical disc 1 is a DVD-R (DVD Recordable) or a DVD-RW (DVD Rewritable). The optical disc 1 includes an information recording layer 5 having a pigment film or a phase change film. The optical disc 1 includes a metal-deposited layer (for example, a gold-deposited layer) 6 which extends below the information recording layer 5 as viewed in FIG. 1. The metal-deposited layer 6 acts to reflect a light beam (a laser beam) B.

The optical disc 1 has an information recording area formed with a spiral of a wobbling groove 2 and a spiral of a land 3. It should be noted that FIG. 1 illustrates the groove 2 and the land 3 in an opposite manner. Specifically, FIG. 1 illustrates the groove 2 and the land 3 as those in a stamper for an optical disc. A portion of the land 3 is located between neighboring portions of the groove 2. A groove portion and a pair of land portions adjoining the groove portion compose a track portion. The groove 2 and the land 3 are coated with a protective film 7. For an easier understanding, groove portions, land portions, and track portions which neighbor in a radial direction of the optical disc 1 are also referred to as grooves, lands, and tracks, respectively.

Alternatively, the optical disc 1 may have a set of concentric circular wobbling grooves 2 and lands 3 formed between neighboring grooves 2.

Main information can be recorded on and reproduced from the groove (or the grooves) 2. First auxiliary information is previously recorded on the optical disc 1 as the wobble of the groove (or the grooves) 2. Second auxiliary information (pre-pit signals or land pre-pit signals) is previously recorded on the land (or the lands) 3. Specifically, the second auxiliary information is represented by pre-pits 4 formed in the land (or the lands) 3. The first auxiliary information and the second auxiliary information are used for the recording of main information on the optical disc 1 or the reproduction of main information therefrom.

The first auxiliary information contains a reference clock signal which is used for the control of rotation of the optical disc 1. The second auxiliary information contains address information from which the position of an arbitrary point on the optical disc 1 can be detected.

During the recording of main information on the optical disc 1 or the reproduction of main information therefrom, the track is scanned by the light beam B while the optical disc 1 is rotated. In this case, the wobble of the groove (or the grooves) 2 and the pre-pits 4 in the land (or the lands) 3 are detected. A wobble signal is generated in response to the detection of the wobble of the groove (or the grooves) 2. The reference clock signal is reproduced from the wobble signal. Rotation of the optical disc 1 is controlled in response to the reproduced reference clock signal. Land pre-pit signals are generated in response to the detection of the pre-pits 4. The position of a currently-accessed point on the optical disc 1 is detected from the land pre-pit signals.

The light beam B is focused into a light spot SP on the optical disc 1. A tracking process forces the center of the light spot SP to move along a substantial central line of the groove 2 during the rotation of the optical disc 1. The light spot SP extends over the groove 2 of interest and also the lands 3 adjoining the groove 2 of the interest. The light beam B is reflected by the optical disc 1, traveling back as a reflected light beam. The reflected light beam is sensed by a photodetector. The photodetector has segments separated by a line parallel to the direction of rotation of the optical disc 1. According to a radial push-pull method using the photodetector, the second auxiliary information represented by the pre-pits 4 is reproduced from portions of the reflected light beam which correspond to the light-spot portions extending over the lands 3. At the same time, the first auxiliary information represented by the wobble of the groove 2 is reproduced from a portion of the reflected light beam which corresponds to the light-spot portion extending over the groove 2. The reference clock signal is detected from the first auxiliary information. The reference clock signal is used for the control of rotation of the optical disc 1.

Figure 2:
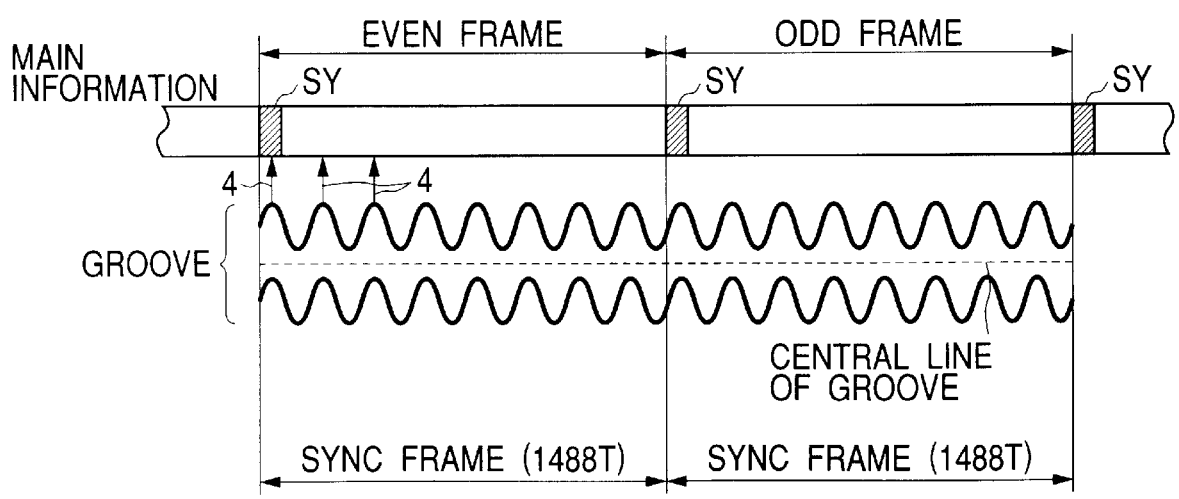
FIG. 2 is a diagram of main information recorded on the optical disc, and pre-pits and a wobbling groove formed therein.

With reference to FIG. 2, the main information recorded on the optical disc 1 is divided into a sequence of sync frames composed of even-numbered frames and odd-numbered frames. One recording sector is composed of 26 successive sync frames. One ECC (error correction code) block is composed of 16 successive recording sectors. Every sync frame has a length of 1488T where T denotes a unit length corresponding to a bit interval prescribed by the format of the recording of the main information on the optical disc 1. A head of every sync frame which has a length of 14T is occupied by sync information SY for providing synchronization per sync frame. The sequence of sync frames is recorded along the wobbling groove 2. Thus, the groove 2 has spaced portions each storing the sync information SY.

The land 3 has first spaced portions and second spaced portions. The first spaced portions of the land 3 adjoin portions of the groove 2 which store even-numbered sync frames respectively. The second spaced portions of the land 3 adjoin portions of the groove 2 which store odd-numbered sync frames. The first spaced portions of the land 3 are formed with pre-pits 4 while the second spaced portions thereof are devoid of pre-pits 4. Alternatively, the second spaced portions of the land 3 may be formed with pre-pits 4. In this case, the first spaced portions of the land 3 are devoid of pre-pits 4.

The land 3 has first spaced regions which neighbor the sync-information storing portions of the even-numbered-sync-frame regions of the groove 2 respectively. Each of the first spaced regions of the land 3 is formed with a pre-pit 4 indicating a sync signal. The land 3 has second spaced regions which neighbor the former halves of the even-numbered-sync-frame regions of the groove 2 respectively. Each of the second spaced regions of the land 3 is formed with at most one or two pre-pits 4 indicating address information.

In the case where the second spaced portions of the land 3 are formed with pre-pits 4 while the first spaced portions thereof are devoid of pre-pits 4, the pre-pit arrangement is designed as follows. The land 3 has first spaced regions which neighbor the sync-information storing portions of the odd-numbered-sync-frame regions of the groove 2 respectively. Each of the first spaced regions of the land 3 is formed with a pre-pit 4 indicating a sync signal. The land 3 has second spaced regions which neighbor the former halves of the odd-numbered-sync-frame regions of the groove 2 respectively. Each of the second spaced regions of the land 3 is formed with at most one or two pre-pits 4 indicating address information.

The groove 2 wobbles at a constant frequency of in common for all the sync frames. The wobble frequency of is equal to, for example, 140 kHz at which one sync frame corresponds to 8 cycles or 8 periods of the wobble. The wobble frequency of is detected by sensing the wobble of the groove 2. The detected wobble frequency of is used for the control of rotation of the optical disc 1.

The positions of the pre-pits 4 are in a predetermined phase relation with the wobble of the groove 2. As shown in FIG. 2, the positions of the pre-pits 4 coincide with points at which the sinusoidal waveform of the wobble of the groove 2 is maximized.

Figure 3:
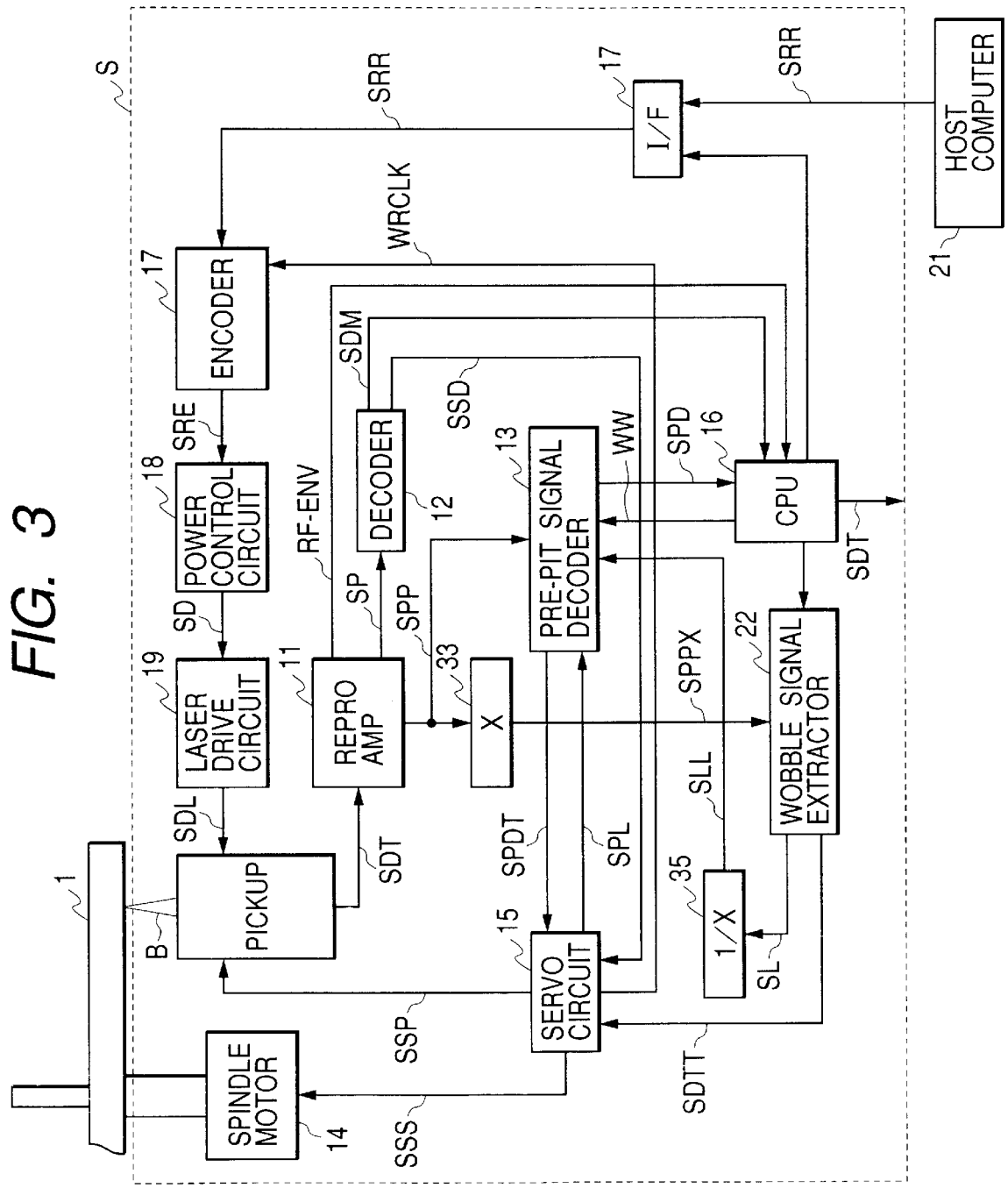
FIG. 3 is a block diagram of an information recording and reproducing apparatus according to a first embodiment of this invention.

FIG. 3 shows an apparatus S for recording and reproducing information on and from the optical disc 1 according to a first embodiment of this invention. Operation of the apparatus S can be changed among various modes including a recording mode, a playback mode, and a preliminary mode. During the recording mode of operation, the apparatus S records main information on the optical disc 1. During the playback mode of operation, the apparatus S reproduces main information from the optical disc 1. The apparatus S is operated in the preliminary mode before being operated in the recording mode. During the preliminary mode of operation, the apparatus S senses the pre-pits 4 in the optical disc 1 and thereby reproduces the address information. The reproduced address information is used during the recording mode of operation. Specifically, the position of a currently-accessed point on the optical disc 1 is detected by referring to the address information during the recording mode of operation.

As shown in FIG. 3, the apparatus S includes a pickup (an optical head) 10, a reproducing amplifier 11, a decoder 12, a pre-pit signal decoder 13, a spindle motor 14, a servo circuit 15, a processor or a CPU 16, an encoder 17, a power control circuit 18, a laser drive circuit 19, an interface 20, a wobble signal extractor 22, an X-fold amplifier 33, and a 1/X-fold amplifier 35.

The pickup 10 can access the optical disc 1. The pickup 10 is connected with the reproducing amplifier 11, the servo circuit 15, and the laser drive circuit 19. The reproducing amplifier 11 is connected with the decoder 12, the pre-pit signal decoder 13, the CPU 16, and the X-fold amplifier 33. The decoder 12 is connected with the servo circuit 15 and the CPU 16. The pre-pit signal decoder 13 is connected with the servo circuit 15, the CPU 16, and the 1/X-fold amplifier 35. The spindle motor 14 acts to rotate the optical disc 1. The spindle motor 14 is connected with the servo circuit 15. The servo circuit 15 is connected with the encoder 17 and the wobble signal extractor 22. The servo circuit 15 controls the spindle motor 14. The servo circuit 15 can move the pickup 10 in a radial direction of the optical disc 1. The CPU 16 is connected with the interface 20 and the wobble signal extractor 22. The CPU 16 is also connected with the servo circuit 15 although the connection therebetween is omitted from FIG. 3. The encoder 17 is connected with the power control circuit 18 and the interface 20. The power control circuit 18 is connected with the laser drive circuit 19. The interface 20 can be connected with an external host computer 21. Digital information SRR to be recorded can be fed to the interface 20 from the host computer 21. The digital information SRR is main information. The wobble signal extractor 22 is connected with the X-fold amplifier 33 and the 1/X-fold amplifier 35.

The pickup 10 includes a laser diode, a deflection beam splitter, an objective lens, and a photodetector. The pickup 10 receives a laser drive signal SDL from the laser drive circuit 19. The laser diode in the pickup 10 is activated by the laser drive signal SDL. Thus, the pickup 10 generates a light beam (a laser beam) B in response to the laser drive signal SDL. The pickup 10 applies the light beam B to an information recording surface of the optical disc 1. The light beam B is reflected by the information recording surface of the optical disc 1, traveling back as a return light beam. A portion of the return light beam is incident to the photodetector in the pickup 10. Thus, the pickup 10 converts the portion of the return light beam into a corresponding electric signal SDT. The pickup 10 senses the pre-pits 4 and the wobble of the groove 2 through the portion of the reflected light beam in the radial push-pull method. During the recording mode of operation, the digital information (the main information) SRR is transmitted to the pickup 10 from the host computer 21 via the interface 20, the encoder 17, the power control circuit 18, and the laser drive circuit 19. The pickup 10 records the digital information SRR on the optical disc 1. During the playback mode of operation, the pickup 10 reproduces digital information (main information) from the optical disc 1 through the portion of the reflected light beam. The pickup 10 outputs the electric signal SDT representative of the reproduced digital information to the reproducing amplifier 11.

The reproducing amplifier 11 separates the output signal SDT of the pickup 10 into a signal SP containing the reproduced main information and a signal SPP containing first auxiliary information and second auxiliary information. The first auxiliary information is represented by the wobble of the groove 2. The second auxiliary information is represented by the pre-pits 4. The reproducing amplifier 11 outputs the main-information signal SP to the decoder 12. The reproducing amplifier 11 outputs the auxiliary-information signal SPP to the pre-pit signal decoder 13 and the X-fold amplifier 33.

The auxiliary-information signal SPP is composed of a true wobble signal caused by the wobble of the groove 2, and spike-like peak signals (pre-pit signals) and spike-like valley signals caused by the pre-pits 4. The level of the true wobble signal alternates. The spike-like peak signals are in phase with the true wobble signal. Specifically, the moments of occurrence of the spike-like peak signals substantially coincide with time points at which the level of the true wobble signal is maximized. This phase relation between the spike-like peak signals and the true wobble signal is provided by the positional relation between the pre-pits 4 and the wobble of the groove 2.

The reproducing amplifier 11 includes a detector for extracting RF components of the output signal SDT of the pickup 10, and for detecting a level (an amplitude) of the extracted RF components. The detector in the reproducing amplifier 11 feeds a signal RF-ENV representative of the detected RF signal level to the CPU 16.

The decoder 12 subjects the main-information signal SP to 8–16 demodulation and de-interleaving to get a main demodulation-resultant signal SDM and a servo demodulation-resultant signal SSD. The decoder 12 outputs the main demodulation-resultant signal SDM to the CPU 16. The decoder 12 outputs the servo demodulation-resultant signal SSD to the servo circuit 15.

The X-fold amplifier 33 amplifies the auxiliary-information signal SPP at a gain corresponding to a factor of X, where X denotes a predetermined positive number. The X-fold amplifier 33 outputs the amplification-resultant signal SPPX to the wobble signal extractor 22.

The pre-pit signal decoder 13 extracts, from the auxiliary-information signal SPP, signals caused by the pre-pits 4. The extracted signals compose a pre-pit detection signal SPDT. The pre-pit signal decoder 13 outputs the pre-pit detection signal SPDT to the servo circuit 15. The pre-pit signal decoder 13 decodes the pre-pit detection signal SPDT into a demodulation-resultant pre-pit signal SPD. The pre-pit signal decoder 13 outputs the demodulation-resultant pre-pit signal SPD to the CPU 16.

Figure 4:
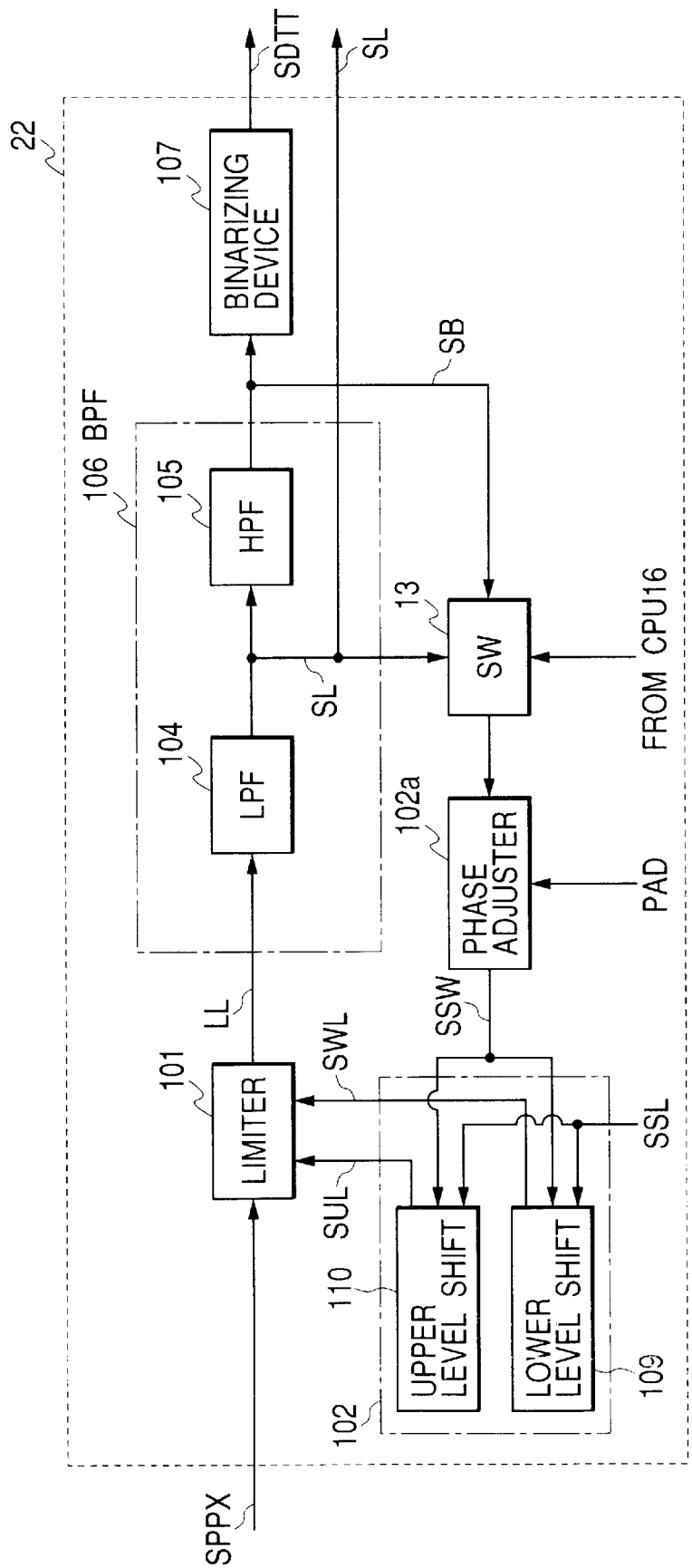
FIG. 4 is a block diagram of a wobble signal extractor in FIG. 3.

As shown in FIG. 4, the wobble signal extractor 22 includes a limiter 101, a limiting level generator 102, a phase adjuster 102a, a switch 103, a band pass filter (BPF) 106, and a binarizing device 107. The limiting level generator 102 has a lower level shift circuit 109 and an upper level shift circuit 110. The band pass filter 106 has a low pass filter (LPF) 104 and a high pass filter (HPF) 105.

The limiter 101 receives the output signal SPPX of the X-fold amplifier 33. The limiter 101 is connected with the LPF 104, the lower level shift circuit 109, and the upper level shift circuit 110. The LPF 104 is connected with the switch 103 and the HPF 105. The LPF 104 is also connected with the 1/X-fold amplifier 35 (see FIG. 3). The switch 103 is connected with the phase adjuster 102a, the HPF 105, and the CPU 16 (see FIG. 3). The phase adjuster 102a is connected with the lower level shift circuit 109, the upper level shift circuit 110, and the CPU 16. The lower level shift circuit 109 is connected with the limiter 101 and the CPU 16. The upper level shift circuit 110 is connected with the limiter 101 and the CPU 16. The HPF 105 is connected with the binarizing device 107. The binarizing device 107 is connected with the servo circuit 15 (see FIG. 3).

The limiter 101 receives a lower limiting signal SWL from the lower level shift circuit 109. The limiter 101 receives an upper limiting signal SUL from the upper level shift circuit 110. The device 101 limits the amplitude of the output signal SPPX of the X-fold amplifier 33 to within a range whose lower and upper limits are determined by the lower and upper limiting signals SWL and SUL respectively. The amplitude limitation suppresses or attenuates spike-like peak signals (pre-pit signals) in the output signal SPPX of the X-fold amplifier 33. The limiter 101 outputs the limiting-resultant signal LL to the low pass filter 104. The limiting-resultant signal LL passes through the LPF 104, becoming a low-pass-filtering resultant signal (an LPF-resultant signal) SL. The spike-like peak signals (the pre-pit signals) have relatively high frequencies, and the LPF 104 suppresses or attenuates the spike-like peak signals (the pre-pit signals). In other words, the LPF 104 suppresses or attenuates components of the limiting-resultant signal LL which have specified high frequencies, and which are caused by the pre-pits. The LPF 104 outputs the LPF-resultant signal SL to the HPF 105. The LPF-resultant signal SL passes through the HPF 105, becoming a high-pass-filtering resultant signal (an HPF-resultant signal) SB. The HPF 105 has a predetermined cutoff frequency lower than the frequency f0 of the true wobble signal. Thus, the true wobble signal passes through the HPF 105 without being considerably attenuated. The HPF 105 outputs the HPF-resultant signal SB to the binarizing device 107. The binarizing device 107 converts the output signal SB of the HPF 105 into a corresponding binary signal SDTT referred to as a reproduced wobble signal. The reproduced wobble signal SDIT has a frequency equal to the wobble frequency f0. The binarizing device 107 outputs the reproduced wobble signal SDTT to the servo circuit 15 (see FIG. 3).

The switch 103 receives the LPF-resultant signal SL from the LPF 104. The switch 103 receives the HPF-resultant signal SB from the HPF 105. The switch 103 selects one from the LPF-resultant signal SL and the HPF-resultant signal SB in response to a control signal fed from the CPU 16 (see FIG. 3). The switch 103 outputs the selected signal to the phase adjuster 102a. The device 102a adjusts the phase of the output signal of the switch 103 in response to phase adjustment data PAD fed from the CPU 16. The phase adjustment by the phase adjuster 102a compensates for signal delays caused by the LPF 104, the HPF 105, the switch 103, the lower level shift circuit 109, and the upper level shift circuit 110. The phase adjuster 102a outputs the adjustment-resultant signal SSW to the lower level shift circuit 109 and the upper level shift circuit 110.

The lower level shift circuit 109 generates the lower limiting signal SWL in response to the output signal SSW of the phase adjuster 102a. The lower level shift circuit 109 outputs the lower limiting signal SWL to the limiter 101. The upper level shift circuit 110 generates the upper limiting signal SUL in response to the output signal SSW of the phase adjuster 102a. The upper level shift circuit 110 outputs the upper limiting signal SUL to the limiter 101. The lower level shift circuit 109 and the upper level shift circuit 110 receive a setting signal SSL from the CPU 16. The lower level shift circuit 109 can set the lower limiting signal SWL to a suitable level in response to the setting signal SSL. The upper level shift circuit 110 can set the upper limiting signal SUL to a suitable level in response to the setting signal SSL. By use of the setting signal SSL, the lower limiting signal SWL and the upper limiting signal SUL can be set to suitable levels which depend on whether the apparatus S is operating in the recording mode or the playback mode.

The LPF 104 is used in two ways. The first way is to generate the lower limiting signal SWL and the upper limiting signal SUL. The second way is to suppress or attenuate the spike-like peak signals (the pre-pit signals) and the spike-like valley signals. The use of the LPF 104 in the two ways is advantageous in simplifying the structure of the apparatus S.

With reference back to FIG. 3, the 1/X-fold amplifier 35 receives the LPF-resultant signal SL from the wobble signal extractor 22. The 1/X-fold amplifier 35 amplifies the LPF-resultant signal SL at a gain corresponding to a factor of 1/X. The gain of the 1/X-fold amplifier 35 is inverse or reciprocal with respect to that of the X-fold amplifier 33. Therefore, the 1/X-fold amplifier 35 retrieves the original signal amplitude which occurs at the circuit stage immediately preceding the X-fold amplifier 33. The 1/X-fold amplifier 35 outputs the amplification-resultant signal SLL to the pre-pit signal decoder 13.

The servo circuit 15 generates a pickup servo signal SSP in response to the pre-pit detection signal SPDT and the servo demodulation-resultant signal SSD. The servo circuit 15 outputs the pickup servo signal SSP to the pickup 10. The pickup servo signal SSP is designed to enable the pickup 10 to implement focus servo control and tracking servo control. The servo circuit 15 generates a spindle servo signal SSS in response to the wobble frequency f0 of the reproduced wobble signal SDTR. The servo circuit 15 outputs the spindle servo signal SSS to the spindle motor 14. The spindle servo signal SSS is designed to implement servo control of the rotation of the spindle motor 14, that is, servo control of the rotation of the optical disc 1. The servo circuit 15 generates a recording clock signal WRCLK in response to the wobble frequency f0 of the reproduced wobble signal SDTT. The servo circuit 15 outputs the recording clock signal WRCLK to the encoder 17. The servo circuit 15 generates a PLL signal SPL synchronized with and locked to the reproduced wobble signal SDTT. The servo circuit 15 outputs the PLL signal SPL to the pre-pit signal decoder 13.

The interface 20 is controlled by the CPU 16. Under the control by the CPU 16, the interface 20 transmits the digital information (the main information) SRR from the host computer 21 to the encoder 17. The encoder 17 includes an ECC generator, an interleaving circuit, an 8–16 modulator, and a scrambler. The encoder 17 divides the digital information SRR into blocks in response to the recording clock signal WRCLK. The encoder 17 generates ECC signals in response to the blocks, respectively. The encoder 17 adds the ECC signals to the blocks to form ECC blocks. The encoder 17 subjects the ECC blocks to interleaving, 8–16 modulation, and scrambling in a prescribed order and in response to the recording clock signal WRCLK, thereby converting the ECC blocks into a modulation-resultant signal SRE. The encoder 17 feeds the modulation-resultant signal SRE to the power control circuit 18.

The power control circuit 18 generates a record signal SD in response to the modulation-resultant signal SRE. The power control circuit 18 outputs the record signal SD to the laser drive circuit 19. The laser drive circuit 19 generates the laser drive signal SDL in response to the record signal SD. The laser drive circuit 19 feeds the laser drive signal SDL to the laser diode in the pickup 10. The laser diode generates the light beam (the laser beam) B in response to the laser drive signal SDL. The digital information (the main information) SRR is contained in the laser drive signal SDL. The light beam B is applied to the optical disc 1 so that the digital information (the main information) SRR is recorded thereon.

The CPU 16 includes a combination of an input/output port, a processing section, a ROM, and a RAM. The CPU 16 operates in accordance with a control program stored in the ROM. The control program is designed to enable the CPU 16 to implement the previously-mentioned steps and also later-mentioned steps of operation.

The CPU 16 can access the pickup 10 and the spindle motor 14 via the servo circuit 15. The CPU 16 derives the address information from the demodulation-resultant pre-pit signal SPD. In response to the address information, the CPU 16 adjusts the pickup 10 and the spindle motor 14 via the servo circuit 15, and thereby controls the place on the optical disc 1 in which the digital information (the main information) SRR is recorded.

As previously mentioned, the CPU 16 receives the main demodulation-resultant signal SDM from the decoder 12 which contains the reproduced main information. The CPU 16 converts the main demodulation-resultant signal SDM into a reproduced signal SOT corresponding to the reproduced main information. The CPU 16 outputs the reproduced signal SOT to an external device (not shown).

The CPU 16 generates the control signal for the switch 103 (see FIG. 4). In addition, the CPU 16 generates the setting signal SSL for the lower level shift circuit 109 and the upper level shift circuit 110 (see FIG. 4). Furthermore, the CPU 16 generates the phase adjustment data PAD for the phase adjuster 102a (see FIG. 4). Also, the CPU 16 generates a digital signal WW representative of a given value. The CPU 16 outputs the digital signal WW to the pre-pit signal decoder 13.

Figure 5:
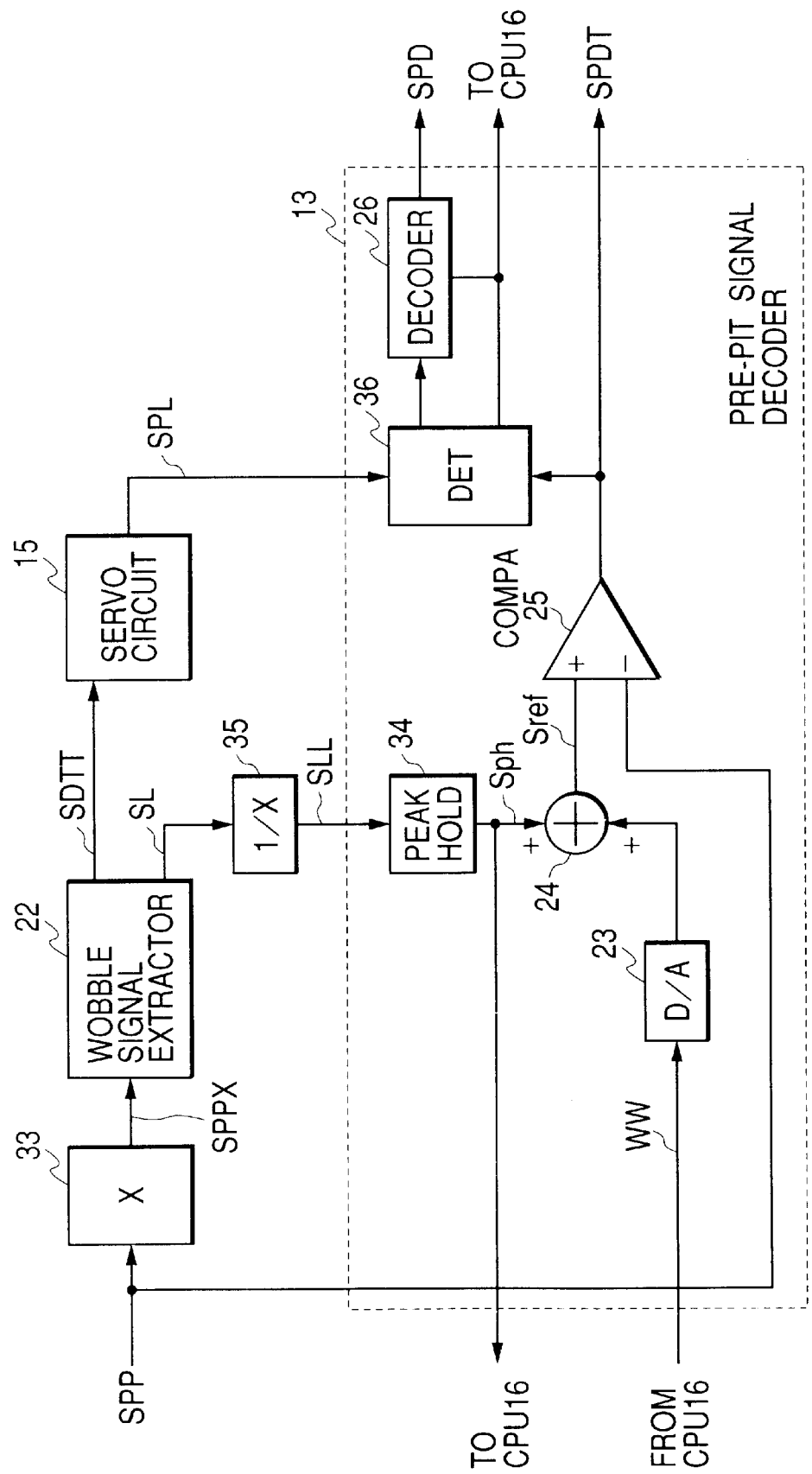
FIG. 5 is a block diagram of a pre-pit signal decoder in FIG. 3.

As shown in FIG. 5, the pre-pit signal decoder 13 includes a D/A (digital-to-analog) converter 23, a threshold-value setting device 24, a comparator 25, a decoder 26, a peak hold circuit 34, and a composite detector 36.

The D/A converter 23 receives the digital signal WW from the CPU 16. The D/A converter 23 is connected with the threshold-value setting device 24. The threshold-value setting device 24 is connected with the comparator 25. The comparator 25 receives the auxiliary-information signal SPP from the reproducing amplifier 11 (see FIG. 3). The comparator 25 is connected with the composite detector 36 and the servo circuit 15. The composite detector 36 receives the PLL signal SPL from the servo circuit 15. The composite detector 36 is connected with the decoder 26 and the CPU 16. The decoder 26 is connected with the CPU 16. The peak hold circuit 34 receives the output signal SLL of the 1/X-fold amplifier 35. The peak hold circuit 34 is connected with the threshold-value setting circuit 24 and the CPU 16.

The D/A converter 23 changes the digital signal WW representative of the given value into a corresponding analog signal. The analog signal has a DC level depending on the given value provided by the CPU 16. The D/A converter 23 outputs the analog signal to the threshold-value setting device 24. The peak hold circuit 34 samples and holds every peak of the output signal SLL of the 1/X-fold amplifier 35. The peak hold circuit 34 outputs a signal Sph representative of the sampled and held peak to the threshold-value setting device 24 and the CPU 16. The threshold-value setting device 24 includes an adder for adding the output signal of the D/A converter 23 and the output signal Sph of the peak hold circuit 34. The threshold-value setting device 24 outputs the addition-resultant signal Sref to the comparator 25. The addition-resultant signal Sref indicates a threshold value. The addition-resultant signal Sref is also referred to as the threshold-value signal. The device 25 compares the auxiliary-information signal SPP and the threshold-value signal Sref, thereby converting the auxiliary-information signal SPP into the pre-pit detection signal SPDT. Accordingly, the comparator 25 acts to generate the pre-pit detection signal SPDT. The comparator 25 outputs the pre-pit detection signal SPDT to the servo circuit 15 and the composite detector 36.

The composite detector 36 includes a sync detecting section which generates a sync signal (a frame sync signal) in response to the PLL signal SPL and the pre-pit detection signal SPDT. The composite detector 36 outputs the sync signal to the CPU 16 and the decoder 26. The composite detector 36 includes a signal comparing section which compares the PLL signal SPL and the pre-pit detection signal SPDT to get a comparison-resultant signal. The composite detector 36 outputs the comparison-resultant signal to the decoder 26.

The decoder 26 decodes the comparison-resultant signal from the composite detector 36 into a demodulation-resultant pre-pit signal SPD. The decoder 26 outputs the demodulation-resultant pre-pit signal SPD to the CPU 16.

Figure 6:
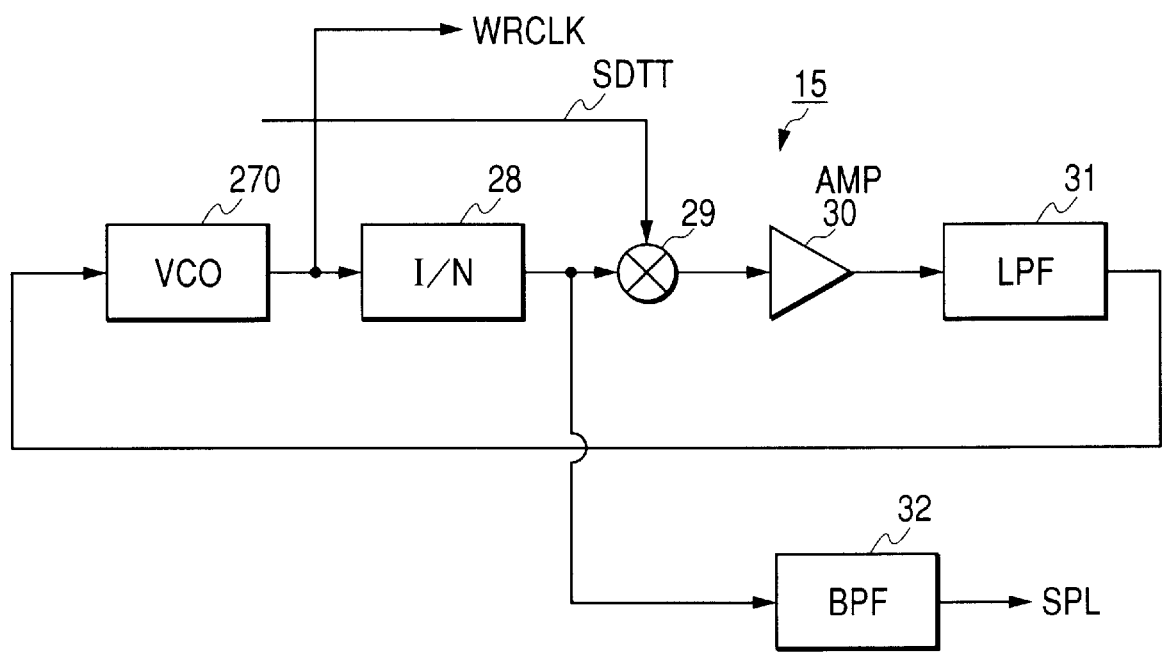
FIG. 6 is a block diagram of a servo circuit in FIG. 3.

As shown in FIG. 6, the servo circuit 15 includes a voltage-controlled oscillator (VCO) 270, an 1/N frequency divider 28, a multiplier 29, an amplifier 30, a low pass filter (LPF) 31, and a band pass filter (BPF) 32. The VCO 270, the frequency divider 28, the multiplier 29, the amplifier 30, and the LPF 31 are sequentially connected in a loop in that order to compose a phase-locked loop (PLL) circuit.

The multiplier 29 receives the reproduced wobble signal SDTT from the wobble signal extractor 22. The multiplier 29 receives an output signal from the frequency divider 28. The device 29 multiplies the reproduced wobble signal SDTT and the output signal of the frequency divider 28, thereby generating a signal representative of the phase error (the phase difference) therebetween. The phase-error signal is transmitted from the multiplier 29 to the LPF 31 via the amplifier 30. The LPF 31 subjects the phase-error signal to a low pass filtering process to get a control voltage. The LPF 31 outputs the control voltage to the VCO 270. The VCO 270 oscillates at a frequency depending on the control voltage. The VCO 270 outputs the resultant oscillation signal to the frequency divider 28. The device 28 divides the frequency of the output signal of the VCO 270 by a predetermined natural number N. The frequency divider 28 outputs the division-resultant signal to the multiplier 29 and the BPF 32. The BPF 32 is tuned to the frequency f0 of the true wobble signal. The BPF 32 subjects the output signal of the frequency divider 28 to a band pass filtering process to get the PLL signal SPL synchronized with and locked to the reproduced wobble signal SDTT. The BPF 32 outputs the PLL signal SPL to the pre-pit signal decoder 13 (see FIG. 3). The oscillation signal outputted from the VCO 270 constitutes the recording clock signal WRCLK. The recording clock signal WRCLK is transmitted from the VCO 270 to the encoder 17 (see FIG. 3).

Figure 7:
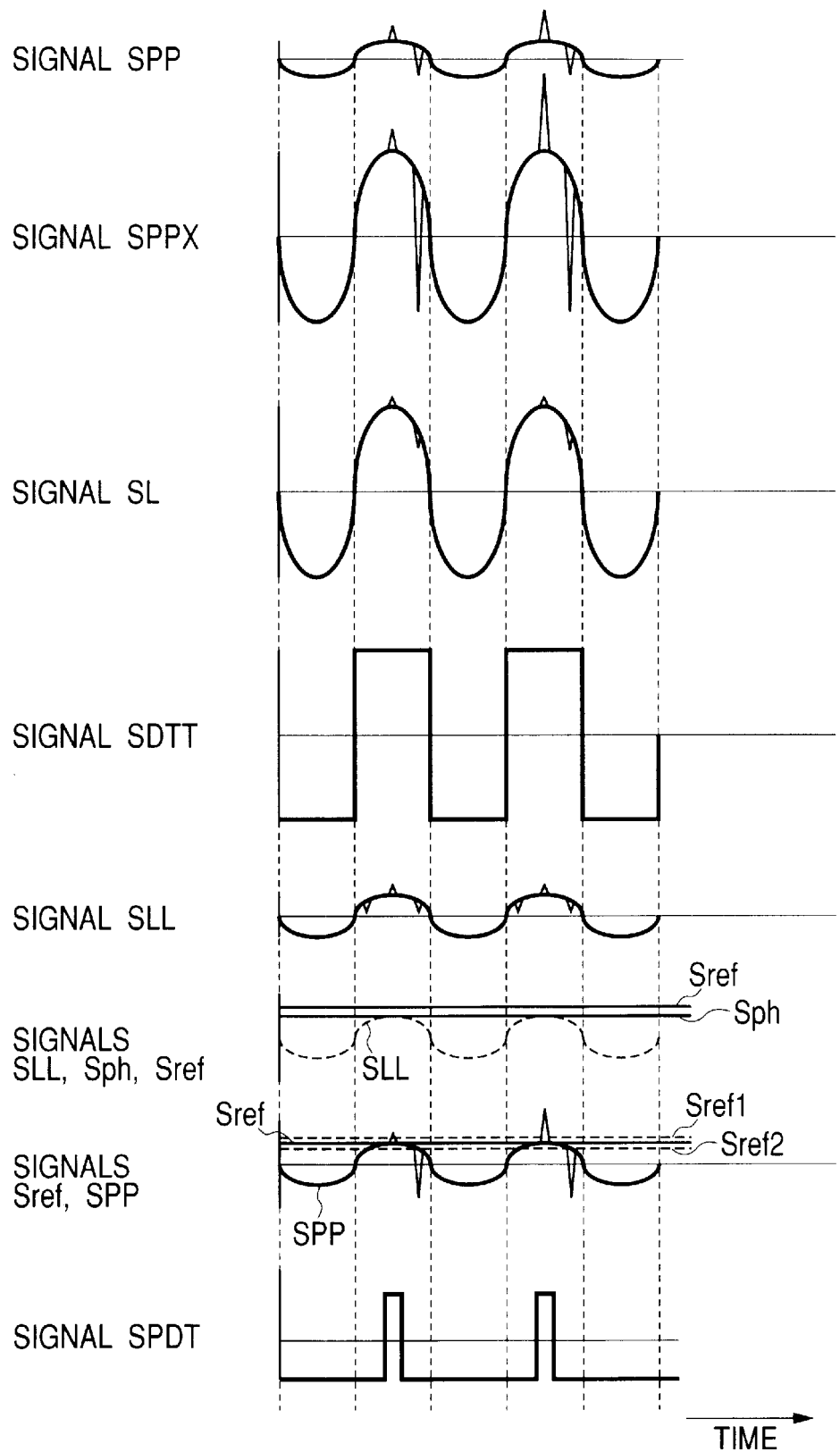
FIG. 7 is a time-domain diagram of various signals in the apparatus of FIG. 3.

As shown in FIG. 7, the auxiliary-information signal SPP outputted from the reproducing amplifier 11 to the pre-pit signal decoder 13 and the X-fold amplifier 33 has a sinusoidal waveform on which spike-like peaks and spike-like valleys are superimposed. The sinusoidal waveform corresponds to a true wobble signal while the spike-like peaks correspond to desired pre-pit signals. On the other hand, the spike-like valleys correspond to undesired pre-pit signals or noise. The time positions of the spike-like peaks coincide with points at which the sinusoidal waveform is maximized.

The X-fold amplifier 33 amplifies the auxiliary-information signal SPP at a gain corresponding to a factor of X. The amplification-resultant signal SPPX outputted from the X-fold amplifier 33 to the wobble signal extractor 22 has a waveform such as shown in FIG. 7.

The limiter 101 in the wobble signal extractor 22 slices off spike-like peaks from the amplification-resultant signal SPPX. Spike-like peaks and spike-like valleys in the amplification-resultant signal SPPX are formed by high-frequency components. The LPF 104 in the wobble signal extractor 22 suppresses or attenuates the spike-like peaks and the spike-like valleys in the amplification-resultant signal SPPX. In this way, the limiter 101 and the LPF 104 process the amplification-resultant signal SPPX into the LPF-resultant signal SL which has a waveform such as shown in FIG. 7.

The 1/X-fold amplifier 35 receives the LPF-resultant signal SL from the wobble signal extractor 22. The 1/X-fold amplifier 35 amplifies the LPF-resultant signal SL at a gain corresponding to a factor of 1/X. The gain of the 1/X-fold amplifier 35 is inverse or reciprocal with respect to that of the X-fold amplifier 33. Therefore, the 1/X-fold amplifier 35 retrieves the original signal amplitude which occurs at the circuit stage immediately preceding the X-fold amplifier 33. The 1/X-fold amplifier 35 outputs the amplification-resultant signal SLL to the pre-pit signal decoder 13. The amplification-resultant signal SLL has a waveform such as shown in FIG. 7. The amplification-resultant signal SLL is equal to the auxiliary-information signal SPP in wobble-signal amplitude. The amplification-resultant signal SLL is in phase with the auxiliary-information signal SPP.

The peak hold circuit 34 in the pre-pit signal decoder 13 samples and holds every peak of the output signal SLL of the 1/X-fold amplifier 35. The peak hold circuit 34 outputs the signal Sph representative of the sampled and held peak to the threshold-value setting device 24 in the pre-pit signal decoder 13. The output signal Sph of the peak hold circuit 34 has a waveform such as shown in FIG. 7.

It should be noted that the peak hold circuit 34 may be omitted. In this case, the amplification-resultant signal SLL is directly applied from the 1/X-fold amplifier 35 to the threshold-value setting device 24.

In the pre-pit signal decoder 13, the threshold-value setting device 24 receives the output signal of the D/A converter 23 which represents the DC level set by the CPU 16. The threshold-value setting device 24 adds the DC-level signal and the output signal Sph of the peak hold circuit 34 to generate the threshold-value signal (the addition-resultant signal) Sref having a waveform such as shown in FIG. 7. The threshold-value setting device 24 outputs the threshold-value signal Sref to the comparator 25.

In the pre-pit signal decoder 13, the device 25 compares the auxiliary-information signal SPP and the threshold-value signal Sref, thereby converting the auxiliary-information signal SPP into the pre-pit detection signal SPDT which has a waveform such as shown in FIG. 7. Generally, the pre-pit detection signal SPDT is effective when the threshold-value signal Sref is in a preferable voltage range between specified levels Sref1 and Sref2 (see FIG. 7).

The wobble signal extractor 22 will be further explained below. The switch 103 in the wobble signal extractor 22 selects one from the LPF-resultant signal SL and the HPF-resultant signal SB in response to the control signal fed from the CPU 16. The switch 103 outputs the selected signal to the phase adjuster 102a. Setting as to which of the LPF-resultant signal SL and the HPF-resultant signal SB should be selected by the switch 103 is performed during the manufacture of the optical disc 1. The setting may be performed in accordance with the type of the optical disc 1 and the recording conditions when the optical disc 1 is inserted into the apparatus S. Alternatively, the setting may be performed as follows. The quality of a reproduced wobble signal is evaluated in each of the first case where the LPF-resultant signal SL is selected and the second case where the HPF-resultant signal SB is selected. The setting is performed in accordance with the better quality of the reproduced wobble signal.

The device 102a adjusts the phase of the output signal of the switch 103 in response to the phase adjustment data PAD fed from the CPU 16. The phase adjuster 102a outputs the adjustment-resultant signal SSW to the lower level shift circuit 109 and the upper level shift circuit 110. The phase adjustment by the phase adjuster 102a is set in accordance with which of the LPF-resultant signal SL and the HPF-resultant signal SB is selected by the switch 103, and also in accordance with the signal delays caused by the LPF 104, the HPF 105, the switch 103, the lower level shift circuit 109, and the upper level shift circuit 110. The setting of the phase adjustment by the phase adjuster 102a is performed during the manufacture of the optical disc 1. The setting may be performed in accordance with the type of the optical disc 1 and the recording conditions when the optical disc 1 is inserted into the apparatus S. Alternatively, the setting may be performed as follows. The quality of a reproduced wobble signal is evaluated while the phase adjustment data PAD are varied, that is, while the phase adjustment by the phase adjuster 102a is varied. The setting is performed in accordance with the best quality of the reproduced wobble signal.

The lower level shift circuit 109 generates the lower limiting signal SWL in response to the output signal SSW of the phase adjuster 102a. The lower level shift circuit 109 outputs the lower limiting signal SWL to the limiter 101. The upper level shift circuit 110 generates the upper limiting signal SUL in response to the output signal SSW of the phase adjuster 102a. The upper level shift circuit 110 outputs the upper limiting signal SUL to the limiter 101. The lower limiting signal SWL and the upper limiting signal SUL can be set by the setting signal SSL fed from the CPU 16. The setting of the lower limiting signal SWL and the upper limiting signal SUL may be performed during the manufacture of the optical disc 1. The setting may be performed in accordance with the type of the optical disc 1 and the recording conditions when the optical disc 1 is inserted into the apparatus S. Alternatively, the setting may be performed as follows. The quality of a reproduced wobble signal is evaluated while the lower limiting signal SWL and the upper limiting signal SUL are varied. The setting is performed in accordance with the best quality of the reproduced wobble signal.

The device 101 limits the amplitude of the output signal SPPX of the X-fold amplifier 33 to within a range whose lower and upper limits are determined by the lower and upper limiting signals SWL and SUL respectively. Specifically, the limiter 101 slices off spike-like peaks (pre-pit signals) from the output signal SPPX of the X-fold amplifier 33. The limiter 101 outputs the limiting-resultant signal LL to the low pass filter 104.

As understood from the previous explanation, the lower and upper limiting signals SWL and SUL are generated on the basis of the LPF-resultant signal SL or the HPF-resultant signal SB. The LPF-resultant signal SL and the HPF-resultant signal SB occur at the circuit stages following the LPF 104 which attenuates spike-like peaks and spike-like valleys being noise with respect to a true wobble signal. Therefore, the lower and upper limiting signals SWL and SUL accurately correspond to the true wobble signal. In other words, the lower and upper limiting signals SWL and SUL accurately follow the true wobble signal. Accordingly, the limiter 101 effectively slices off spike-like peaks (pre-pit signals) from the output signal SPPX of the X-fold amplifier 33.

Second Embodiment

A second embodiment of this invention is a modification of the first embodiment thereof. The second embodiment of this invention is designed to handle a recording medium different from a DVD-R and a DVD-RW. The recording medium is formed with a track having a wobble representative of auxiliary information for the control of the recording of main information thereon. The recording medium is of, for example, a tape-like shape.

What is claimed is:

1. An apparatus for recording and reproducing information on and from a recording medium formed with a track and pre-pits, the track having a wobble, the pre-pits being in a predetermined phase relation with the wobble of the track, the apparatus comprising:
   a pickup for reproducing a signal from the recording medium;
   a limiter for limiting an amplitude of the signal reproduced by the pickup in response to a limiting level, and thereby processing the signal reproduced by the pickup into a limiting-resultant signal;
   a filter for suppressing components of the limiting-resultant signal generated by the limiter, and thereby processing the limiting-resultant signal into a filtering-resultant signal, the components having specified frequencies and being caused by the pre-pits;
   first means for generating the limiting level for the limiter in response to the filtering-resultant signal generated by the filter; and
   second means for extracting, from the filtering-resultant signal generated by the filter, a signal caused by the wobble of the groove.

2. An apparatus as recited in claim 1, further comprising third means for controlling the limiting level for the limiter in response to whether the apparatus is operating in a recording mode or a reproducing mode.

3. An apparatus for recording and reproducing information on and from a recording medium formed with a track and pre-pits, the track having a wobble, the pre-pits being in a predetermined phase relation with the wobble of the track, the apparatus comprising:
   a pickup for reproducing a signal from the recording medium;
   a limiter for limiting an amplitude of the signal reproduced by the pickup in response to a limiting level, and thereby processing the signal reproduced by the pickup into a limiting-resultant signal;
   a filter for suppressing components of the limiting-resultant signal generated by the limiter, and thereby processing the limiting-resultant signal into a filtering-resultant signal, the components having specified frequencies and being caused by the pre-pits;
   a phase adjuster for adjusting a phase of the filtering-resultant signal generated by the filter, and thereby changing the filtering-resultant signal generated by the filter into an adjustment-resultant signal;
   first means for generating the limiting level for the limiter in response to the adjustment-resultant signal generated by the phase adjuster; and
   second means for extracting, from the filtering-resultant signal generated by the filter, a signal caused by the wobble of the groove.

4. An apparatus as recited in claim 3, wherein the phase adjuster comprises means for adjusting the phase of the filtering-resultant signal by a variable quantity.

5. An apparatus for recording and reproducing information on and from a recording medium formed with a track and pre-pits, the track having a wobble, the pre-pits being in a predetermined phase relation with the wobble of the track, the apparatus comprising:
   a pickup for reproducing a signal from the recording medium;
   a first amplifier for amplifying the signal reproduced by the pickup into a first amplification-resultant signal at a gain corresponding to a factor of X, where X denotes a predetermined positive number;
   a limiter for limiting an amplitude of the first amplification-resultant signal generated by the first amplifier in response to a limiting level, and thereby processing the first amplification-resultant signal into a limiting-resultant signal;
   a low pass filter for suppressing components of the limiting-resultant signal generated by the limiter, and thereby processing the limiting-resultant signal into a first filtering-resultant signal, the components having specified frequencies and being caused by the pre-pits;
   first means for generating the limiting level for the limiter in response to the first filtering-resultant signal generated by the low pass filter;
   a high pass filter for processing the first filtering-resultant signal generated by the low pass filter into a second filtering-resultant signal;
   second means for converting the second filtering-resultant signal generated by the high pass filter into a signal corresponding to the wobble of the groove;
   a second amplifier for amplifying the first filtering-resultant signal generated by the low pass filter into a second amplification-resultant signal at a gain corresponding to a factor of 1/X; and
   a comparator for comparing the signal reproduced by the pickup and the second amplification-resultant signal generated by the second amplifier to generate a signal corresponding to the pre-pits.

6. An apparatus as recited in claim 5, wherein the limiting level for the limiter is variable.

7. An apparatus as recited in claim 5, further comprising third means for controlling the limiting level for the limiter in response to whether the apparatus is operating in a recording mode or a reproducing mode.

* * * * *